United States Patent
Clark et al.

(10) Patent No.: US 11,810,587 B2
(45) Date of Patent: Nov. 7, 2023

(54) NOISE FILTRATIONS BASED ON RADAR

(71) Applicant: Hewlett-Packard Development Company, L.P., Spring, TX (US)

(72) Inventors: Alexander Wayne Clark, Spring, TX (US); Hui Leng Lim, Spring, TX (US); Chi So, Spring, TX (US)

(73) Assignee: Hewlett-Packard Development Company, L.P., Spring, TX (US)

(*) Notice: Subject to any disclaimer, the term of this patent is extended or adjusted under 35 U.S.C. 154(b) by 47 days.

(21) Appl. No.: 17/419,767

(22) PCT Filed: Jul. 26, 2019

(86) PCT No.: PCT/US2019/043620
§ 371 (c)(1),
(2) Date: Jun. 30, 2021

(87) PCT Pub. No.: WO2021/021075
PCT Pub. Date: Feb. 4, 2021

(65) Prior Publication Data
US 2022/0148610 A1   May 12, 2022

(51) Int. Cl.
*G10L 21/0232* (2013.01)
*G01S 13/72* (2006.01)
(Continued)

(52) U.S. Cl.
CPC ........ *G10L 21/0232* (2013.01); *G01S 13/726* (2013.01); *G01S 13/86* (2013.01);
(Continued)

(58) Field of Classification Search
CPC . G10L 2021/02087; G10L 2021/02166; G10L 21/0208; G10L 21/0232; H04M 3/564; H04M 3/568; H04M 2242/30; H04M 2250/12; H04M 3/18; H04R 1/406; H04R 2201/401; H04R 2410/01; H04R 3/005
(Continued)

(56) References Cited

U.S. PATENT DOCUMENTS

| 5,625,684 A | 4/1997 | Matouk et al. |
| 8,538,492 B2 | 9/2013 | Sweeney et al. |

(Continued)

FOREIGN PATENT DOCUMENTS

| CN | 109120790 A | 1/2019 |
| KR | 20150125264 A | 11/2015 |

(Continued)

*Primary Examiner* — Lun-See Lao
(74) *Attorney, Agent, or Firm* — Quarles & Brady LLP

(57) ABSTRACT

In example implementations, an apparatus is provided. The apparatus includes a microphone, a radar, a memory, and a processor in communication with the microphone, the radar, and the memory. The microphone is to receive audio signals. The radar is to collect data on users in a location. The memory is to store known body positions associated with having a side-conversation. The processor is to determine that a user is having a side-conversation based on the data collected by the radar compared to the known body positions associated with having a side-conversation and filter noise associated with the side-conversation received by the microphone from a direction associated with the user.

15 Claims, 6 Drawing Sheets

(51) Int. Cl.
    *G01S 13/86*     (2006.01)
    *G06F 3/16*     (2006.01)
    *H04M 3/56*     (2006.01)
    *H04R 1/40*     (2006.01)
    *H04R 3/00*     (2006.01)
    *G10L 21/0216*     (2013.01)

(52) U.S. Cl.
    CPC ............ *G06F 3/165* (2013.01); *H04M 3/568* (2013.01); *H04R 1/406* (2013.01); *H04R 3/005* (2013.01); *G10L 2021/02166* (2013.01); *H04R 2201/401* (2013.01); *H04R 2410/01* (2013.01)

(58) Field of Classification Search
    USPC .................................. 381/92, 56–58; 700/94
    See application file for complete search history.

(56) References Cited

U.S. PATENT DOCUMENTS

| | | | |
|---|---|---|---|
| 8,594,845 B1 * | 11/2013 | Gharpure | G10L 15/22 901/1 |
| 9,747,917 B2 | 8/2017 | Tzirkel-Hancock et al. | |
| 9,922,635 B2 | 3/2018 | Stewart et al. | |
| 10,049,652 B1 | 8/2018 | Smith et al. | |
| 10,162,421 B2 * | 12/2018 | Wei | G06F 3/017 |
| 2012/0327115 A1 * | 12/2012 | Chhetri | H04R 3/005 345/633 |
| 2013/0058496 A1 | 3/2013 | Harris | |
| 2013/0300648 A1 * | 11/2013 | Kim | G04G 21/00 345/156 |
| 2017/0282371 A1 * | 10/2017 | Erhart | G06Q 30/016 |
| 2018/0220231 A1 * | 8/2018 | Thakkar | G10K 11/1785 |

FOREIGN PATENT DOCUMENTS

| | | |
|---|---|---|
| TW | 1649576 | 2/2019 |
| TW | 202009654 | 3/2020 |
| WO | 2006/121896 A2 | 11/2006 |
| WO | 2018/151717 A1 | 8/2018 |
| WO | WO-2018143979 | 8/2018 |
| WO | WO-2018143979 A1 | 8/2018 |
| WO | WO-2019079855 | 5/2019 |
| WO | WO-2019079855 A1 | 5/2019 |

* cited by examiner

NOISE FILTRATIONS BASED ON RADAR

BACKGROUND

Various types of communication and communication devices are used by businesses to improve productivity. One type of communication is a conference call. For example, a speaker and microphone device can be used in a conference room with many people and connected to another device at a different geographic location. The devices may allow individuals to speak to one another from different locations in a conference call. The conference call may be conducted with a speaker and microphone device or with a computer that can also provide video images along with the audio.

DETAILED DESCRIPTION

Examples described herein provide an apparatus and method to generate an audio signal with noise filtration based on data collected from a radar. As noted above, some businesses may use conference calls to improve productivity. A conference call may have many individuals in a conference room who are speaking to individuals at another location.

In some instances, individuals in the conference room may begin having side conversations with one another. The side conversations can generate additional noise and make it difficult for the individuals on the other end of the conference call to hear the speaker or speakers. The side conversations can be distracting.

Examples herein provide a device with radar to detect when side-conversations are occurring and perform noise filtering to remove the side-conversations from the sound or audio signal. For example, the radar may detect body positions. Certain body positions may be deterministic of whether a person is listening to a speaker or having a side-conversation with another user.

When the radar information detects that an individual or individuals in a conference room are having a side-conversation, the noise or audio coming from the individuals can be filtered out of a generated audio signal. For example, the radar may collect information regarding where the individuals are sitting in the conference room. Microphones on the device that collect audio signals from the determined direction may be muted, or the audio collected by the microphones may be filtered out.

The device may generate an audio signal with the side-conversations filtered out. As a result, the audio signal that is transmitted may be clearer, and the individuals on the other end of the conference call may hear the speaker more clearly without distraction from the side-conversations.

Figure 1:
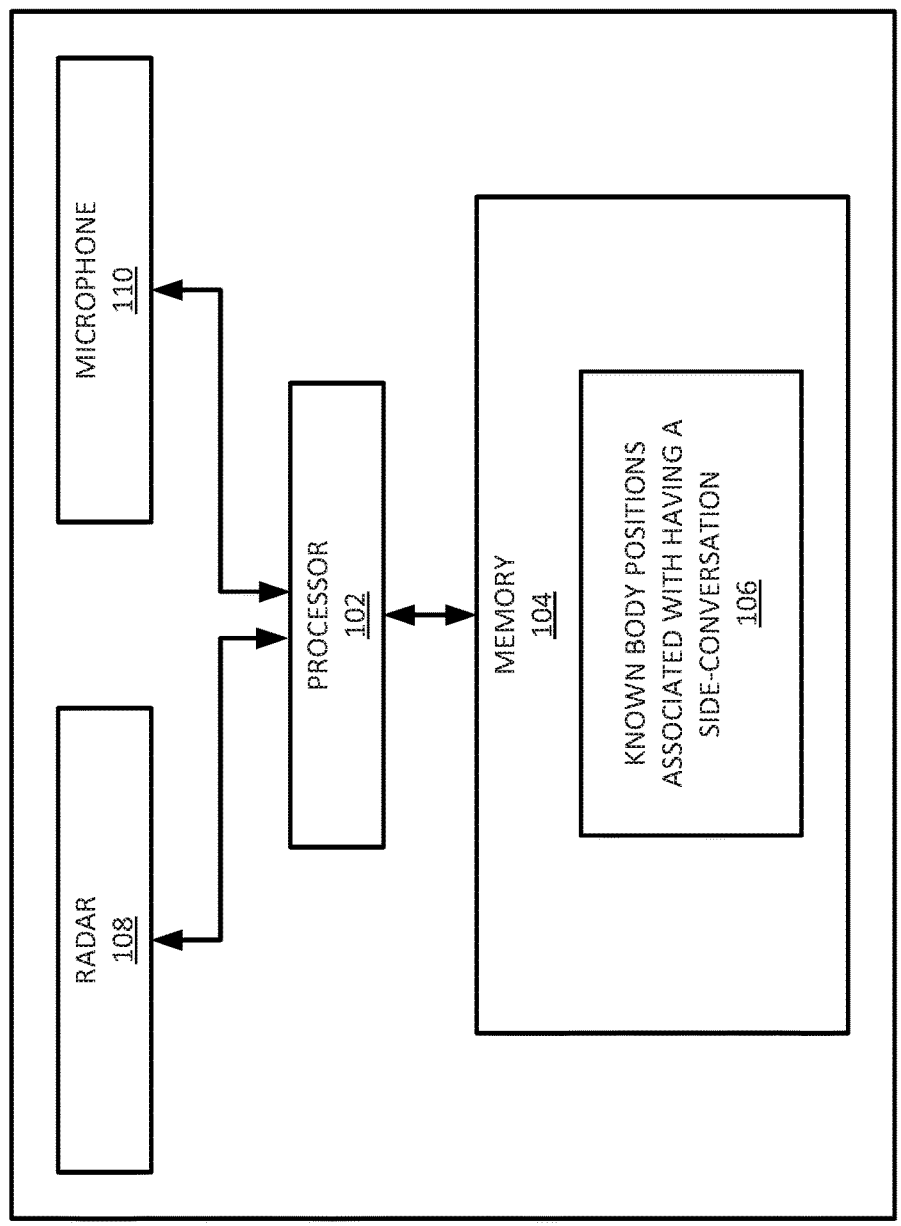
FIG. 1 is a block diagram of an example apparatus with radar and noise filtration of the present disclosure.

FIG. 1 illustrates an example apparatus 100 of the present disclosure. In an example, the apparatus 100 may be a computing device such as a desktop computer, a laptop computer, a tablet computer, and the like. In an example, the apparatus 100 may be a conference call device. For example, the conference call device may be a device that can be placed in a conference room and be connected to another remotely located conference call device to transmit and receive audio signals.

In an example, the apparatus 100 may include a processor 102, a memory 104, a radar 108, and a microphone 110. In one example, the processor 102 may be communicatively coupled to the memory 104, the radar 108, and the microphone 110. The processor 102 may control operation of the radar 108 and the microphone 110. The processor 102 may also execute instructions stored in the memory 104 to perform the functions described herein.

In an example, the memory 104 may be a non-transitory computer-readable medium. For example, the memory 104 may be a hard disk drive, a solid state drive, a random access memory (RAM), a read only memory (ROM), and the like. The memory 104 may include multiple memory devices (e.g., a hard disk drive and RAM).

In an example, the memory 104 may store known body positions associated with having a side-conversation 106 (also herein referred to as "known body positions" 106). The known body positions 106 may be pre-defined or learned in advance. The known body positions 106 may be used to determine whether position data of a user indicates whether the user is having a side-conversation. The processor 102 may then filter the noise associated with the side-conversation from an audio signal that is generated.

In an example, the known body positions 106 may be dynamically updated as the radar 108 collects more position data of a user over time at a particular location. For example, machine learning or deep learning may be used to dynamically update the known body positions 106 over time at a particular location for a particular group of users. Thus, the known body positions 106 may be customized over time for a particular group of users at a particular location.

In an example, the radar 108 may collect position data of a user or users in a location or a room. The radar 108 may be a millimeter wave detection device that can emit a radio frequency (RF) signal and measure a response of the RF signal that is returned after bouncing off of an object. Although a millimeter wave detection device is used, other types of radar devices may also be implemented such as a light wave detection device or Lidar.

The radar 108 may transmit multiple RF signals that collect a plurality of position data points for each user or users in a room. The data collected by the radar 108 may include a distance from the radar 108 or apparatus 100, an angle at which a user is sitting relative to the apparatus 100, a motion vector of the user, a direction of the user relative to the apparatus 100, and the like.

In an example, the radar 108 may detect position data in 180 degrees. Thus, in a room where everyone sits in front of the apparatus 100, a single radar 108 may be used. In a room where users sit around the apparatus 100, two radars 108 may be arranged back-to-back to obtain position data of the users at all angles 360 degrees around the room.

Figure 3:
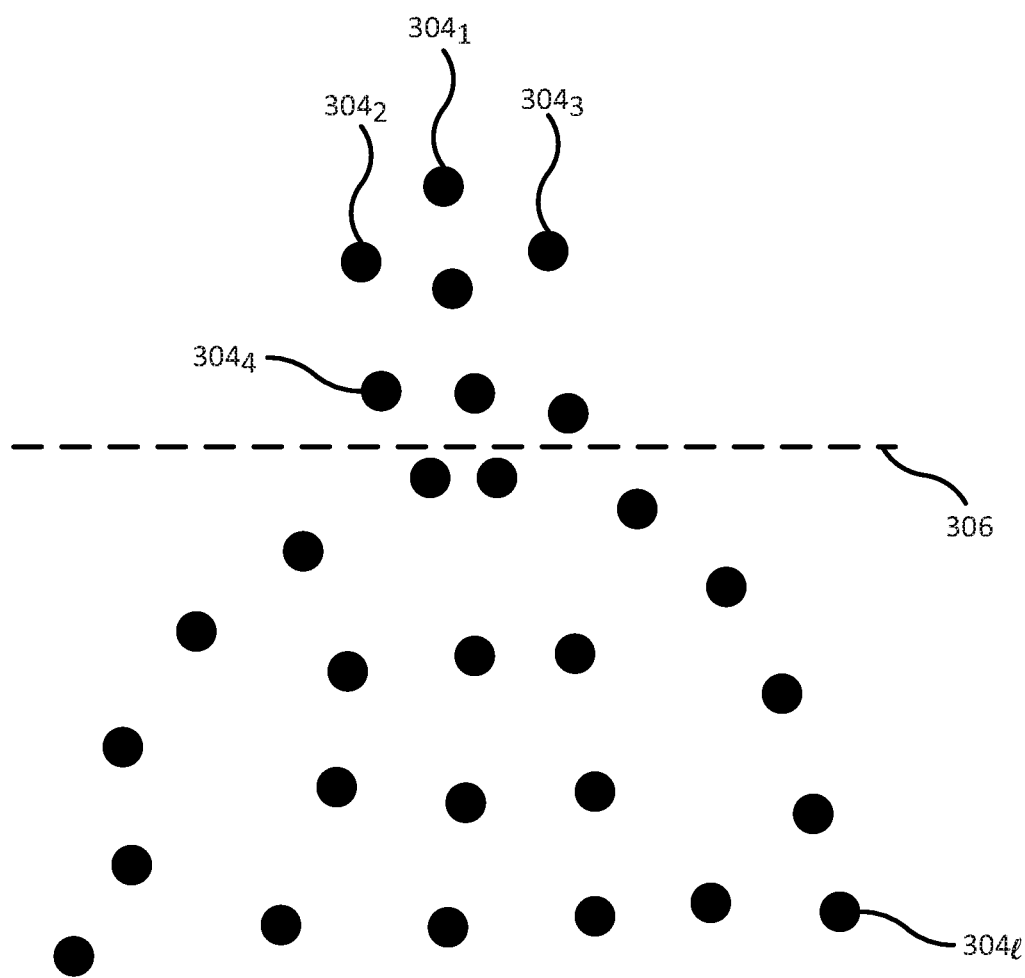
FIG. 3 is a block diagram of an example of a radar image of the present disclosure.

An example of a radar image 302 is illustrated in FIG. 3. As noted above, the radar 108 may transmit multiple RF signals that collect a plurality of position data points $304_1$ to $304_j$ (hereinafter also referred to individually as a position data point 304 or collectively as position data points 304). In one example, the position of a user may be determined based on an average of the position data points 304. For example, the distance of a user from the radar 108 or the apparatus 100 may be an average of the distance of each one of the position data points 304.

In an example, a position or posture of a user may be determined based on a shape of the position data points 304. For example, the position data points 304 above a line 306 may represent a head of a user. The position data points 304 below the line 306 may represent a torso of the user. Thus, the position or posture of the user may be determined based on estimated positions of the user's head and torso.

For example, a certain arrangement of the position data points 304 may indicate that the head of the user is turned in a particular direction. A certain arrangement of the position data points 304 may indicate that the torso of the user is leaning away from the apparatus 100 or turned in a particular direction.

The angle of the user relative to the apparatus 100 may also be estimated based on the arrangement of the position data points 304. For example, when the user is facing the apparatus 100 directly (e.g., associated with 0 degrees relative to the apparatus 100), the arrangement of the position data points 304 may have a maximum width. As the user turns his or her torso to the left or the right, the torso may appear narrower. When the user is turned side-ways relative to the apparatus 100 (e.g., associated with 90 degrees), the arrangement of position data points 304 may have a minimum width. When the user is at 45 degrees the arrangement of position data points 304 may have a width that is between the maximum width and the minimum width.

As noted above, the known body positions 106 may store known body positions that are associated with having a side-conversation. The arrangement of the position data points 304 may be compared to the positions (e.g., pre-defined arrangement of position data points 304) stored in the known body positions 106.

For example, the known body positions 106 may associate a user positioned at 45 degrees or greater relative to the apparatus 100 as having a side-conversation (e.g., the user is turned towards another user). In another example, if the torso of the user is leaning away from the apparatus and the head of the user is turned to the left or the right, the user may be having a side-conversation (e.g., the user is leaning back and speaking to someone behind the user). In another example, if the torso is leaning forward and the head is lowered the user may be having a side conversation (e.g., the user is ducking down to avoid being seen as the user is having a side-conversation). The examples described herein are a few examples of possible known body positions associated with having a side-conversation. Other examples may be within the scope of the present disclosure.

In some examples, the known body positions 106 may store known body positions for multiple users. For example, side-conversations may occur between two users that are angled relative towards one another or within a distance threshold between users. The position data points 304 for two adjacent users may be compared to the pre-defined arrangement of position data points 304 for adjacent users in the known body positions 106 to determine if two users are having a side-conversation.

In addition, where there are multiple users in a room, position data points 304 may be collected for each user. The radar 108 may collect directional data as well. For example, the motion vector data may indicate whether a user is moving and in which direction the user is located relative to the radar 108.

If the arrangement of position data points 304 matches a predefined arrangement in the known body positions 106, then the processor 102 may determine that the user is having a side-conversation. The processor 102 may then filter the noise from the side-conversation out of an audio signal that is generated.

In an example, the position data points 304 of users in a room may be tracked continuously. In an example, the position data points 304 of users in a room may be tracked periodically (e.g., every 10 seconds, every 30 seconds, every minute, and the like).

In an example, the known body positions 106 may also store body positions that can be associated with other types of movements that may create distracting noises. For example, the known body positions 106 may store body positions associated with someone leaving a room, which may create distracting noises of a chair squeaking, rustling of clothes, a door closing, and the like. The known body positions 106 may store body positions associated with someone eating, which may create distracting noises such as chewing sounds, crunching, rustling of a wrapper, and the like.

Referring back to FIG. 1, the apparatus 100 may also include the microphone 110. The microphone 110 may receive audio signals from the room in which the apparatus 100 is located. The audio signals may include voices of speakers or any other person speaking in the room.

When a side-conversation occurs in the room, the noises and/or voices associated with the side-conversation may be distracting to a listener who is trying to hear a speaker on another remotely connected apparatus 100. Thus, when the processor 102 determines that a user is having a side-conversation, the processor 102 may filter the noise associated with the side-conversation from the audio signal that is captured from the users in the room. In other words, the audio signal may be modified to remove the speech or noise associated with the side-conversations that are detected.

Figure 4:
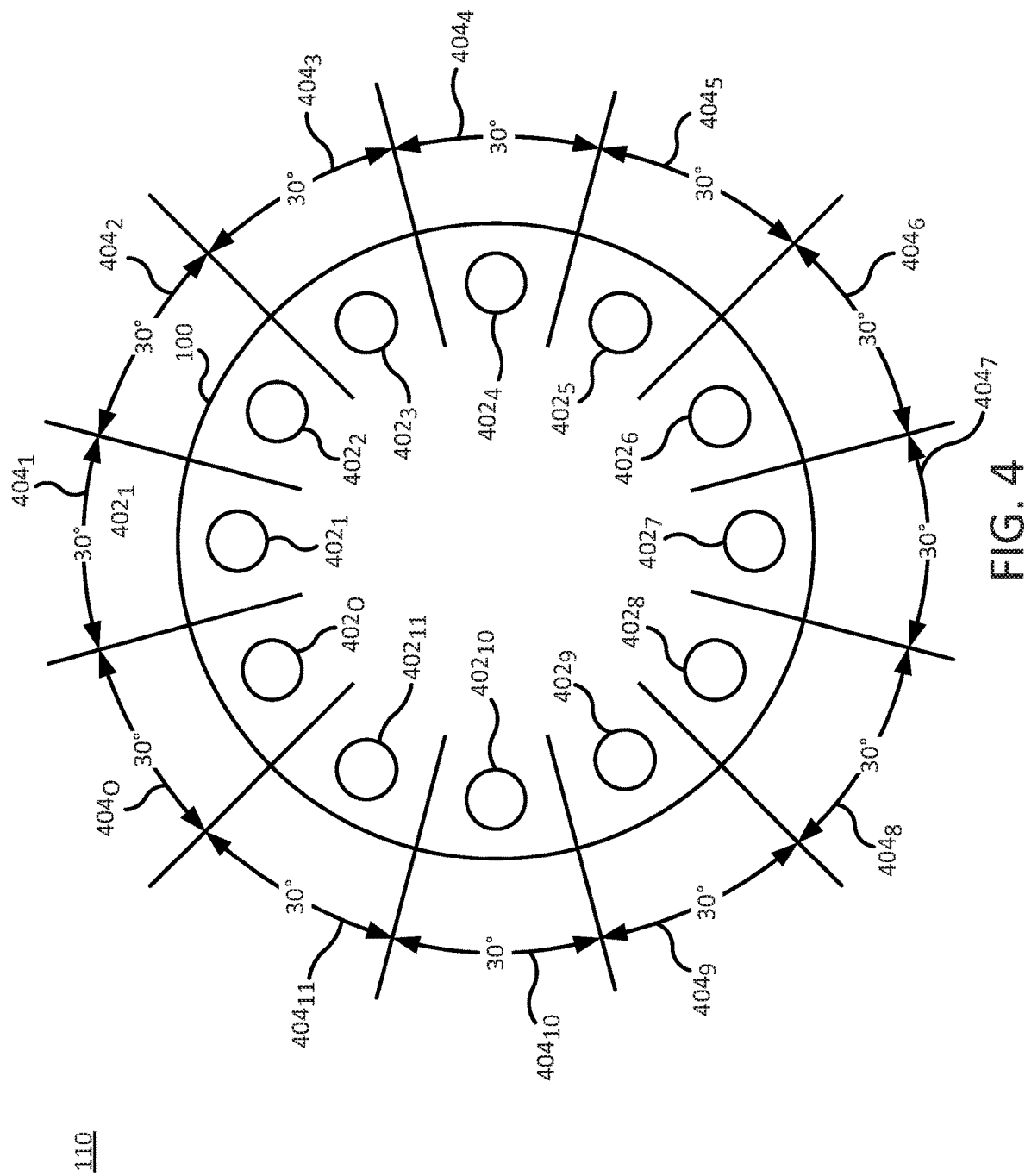
FIG. 4 is a block diagram of noise filtration based on the radar information of the present disclosure.

FIG. 4 illustrates an example of the microphone 110. In one example, the microphone 110 may comprise a plurality of microphones or microphone inputs $402_1$ to $402_o$ (hereinafter also referred to individually as a microphone 402 or collectively as microphones 402). Each microphone 402 may be responsible for receiving audio signals in a particular angular direction relative to a center of the microphone 110. For example, there may be 12 microphones 402 arranged around the microphone 110. Each microphone 402 may be associated with a range of 30 degree coverage. Each microphone 402 may receive audio signals from a different direction $404_1$ to $404_o$ (hereinafter also referred to as a direction 404 or collectively as directions 404) within the respective 30 degree range.

In one example, where users are sitting in front of the apparatus 100, half of the microphones 402 may be used to obtain 180 degree coverage (e.g., similar to the radar 108). When users are sitting around the apparatus 100, all of the microphones 402 may be used to obtain 360 degree coverage.

As noted above, the processor 102 may determine a direction of the user relative to the apparatus 100. The processor 102 may then determine the microphone 402 that covers the direction 404 of a user having a side-conversation. For example, a user may be having a side-conversation from a direction $404_2$ that is covered by the microphone $402_2$. In other words, the direction of the user may be within the angular range covered by the microphone $402_2$. Said another way, the angular range of the microphone $402_2$ may include the direction from which the noise associated with the side-conversation is being received.

In an example, the processor 102 may filter the noise by muting the microphone $402_2$. Thus, audio signals that are coming from a direction covered by the microphone $402_2$ may be eliminated from the audio signal generated by the processor 102. In other words, the processor 102 may selectively control operation of each microphone 402 based on the microphone 402 that covers a direction from which users having a side-conversation are detected.

In an example, the processor 102 may filter the noise digitally. For example, the processor 102 may identify that a user in a direction covered by the microphone $402_2$ is having a side-conversation. The processor 102 may then digitally remove audio signals that are received by the microphone $402_2$. In other words, the microphones $402_1$ to $402_o$ may remain on and the processor 102 may digitally remove the audio signals from certain microphones $402_1$ to $402_o$ from an audio signal for transmission as part of a conference call or to another remotely located apparatus 100. In one example, when the audio signals from certain microphones $402_1$ to $402_o$ are filtered out, a modified audio signal may be generated that excludes the noise or speech associated with the side-conversation.

In an example, the processor 102 may continue to collect the position data points 304 from the radar 108 to determine whether a side-conversation is occurring. For example, after the microphone $402_2$ is muted or the audio signal is digitally removed, the processor may continue to analyze the position data points 304 of a user in a direction covered by the microphone $402_2$. At a later time, the user may stop having the side-conversation. As a result, the processor 102 may unmute the microphone $402_2$ or re-add the audio signals received by the microphone $402_2$ to the audio signal or audio signals that are received during a conference call.

In an example, additional characteristics may be used in addition to the known body positions 106 to determine if a side-conversation is occurring. For example, a volume level of the noise or speech that is received in combination with the known body position 106 may be used to determine if a side-conversation is occurring. For example, a side-conversation may have a lower volume than other speech from a user who is speaking at a location. Thus, if the speech or noise is below a volume threshold and the position data points 304 of a user match a known body position 106, then the processor 102 may determine that a side-conversation is occurring.

It should be noted that although 12 microphones 402 are illustrated by example in FIG. 4, any number of microphones may be deployed. For example, more than 12 microphones may be deployed for greater granularity or less than 12 microphones may be deployed for lower costs, but less accuracy.

Referring back to FIG. 1, it should be noted that the apparatus 100 has been simplified for ease of explanation. For example, the apparatus 100 may include additional components that are not shown, such as a display, a speaker, a user interface, input buttons or controls, and the like.

In one example, the known body positions 106 may also be stored in a remotely located server. The known body positions 106 may be updated over time based real-time data at locations where the apparatuses 100 are deployed. The remotely located server may then upload the updated known body positions 106 to other apparatuses 100 that are located at different locations. Thus, the known body positions 106 stored locally at the apparatus 100 may be kept up to date even if infrequently used at a particular location.

Figure 2:
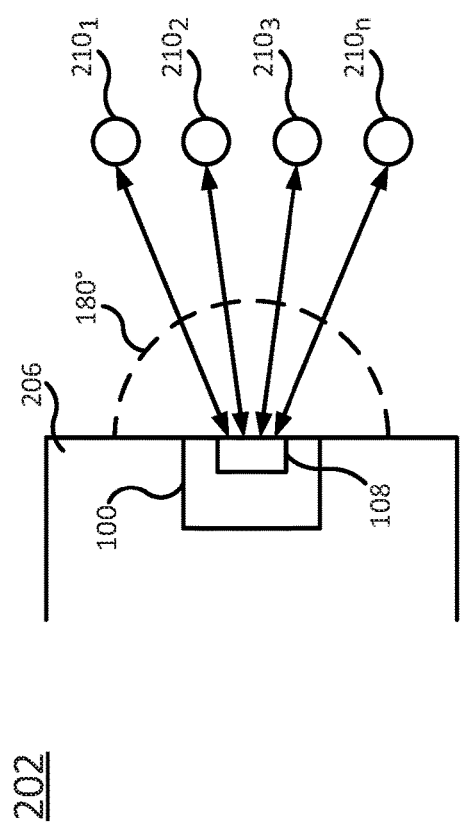
FIG. 2 is a block diagram of the apparatus operating in a conference room of the present disclosure.
Figure 2:
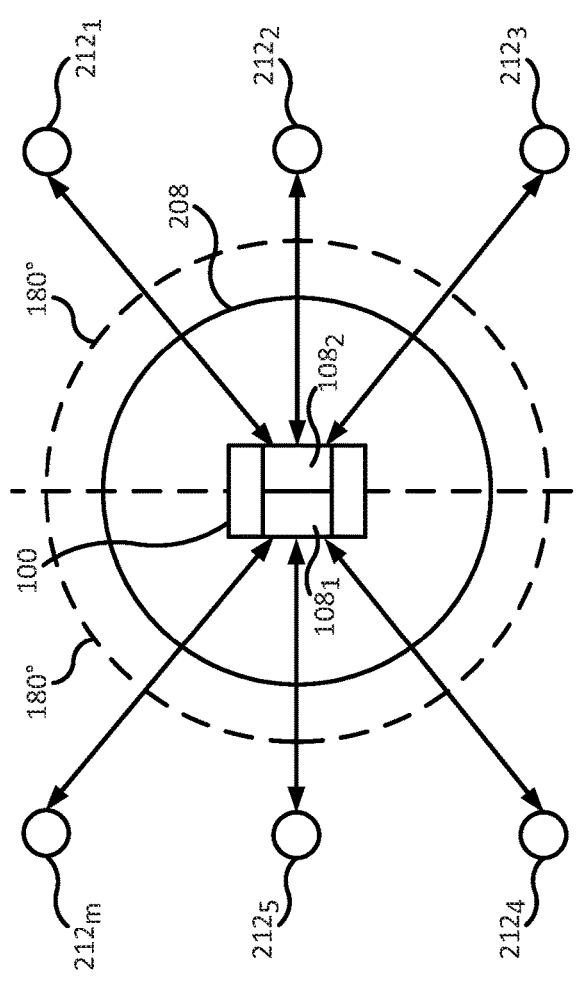

FIG. 2 illustrates an example block diagram of the apparatus 100 operating in a conference room. FIG. 2 illustrates an arrangement 202 where the apparatus 100 is facing users $210_1$ to $210_n$ (hereinafter also referred to individually as a user 210 or collectively as users 210) and an arrangement 204 where users $212_1$ to $212_m$ (hereinafter also referred to individually as a user 212 or collectively as users 212) are sitting around the apparatus 100.

In the arrangement 202, the apparatus 100 may be placed on a table 206 towards a front of the conference room. The users 210 may sit in front of the apparatus 100 and within a 180 degree range of the radar 108.

In one example, the radar 108 may collect position data of the users 210 as described above. The processor 102 may begin analyzing the position data of the users 210 collected by the radar 108 after the users 210 sit down. For example, the users 210 may enter the room and have motion vectors measured by the radar 108 that indicate movement greater than a threshold. When the users 210 sit down, the motion vectors of the position data collected by the radar 108 may be zero or less than the threshold. The processor 102 may determine that the users 210 are sitting down when the motion vectors are less than the threshold.

In other words, while the users 210 are moving, the processor 102 may determine that the users 210 are entering the room and the meeting has not yet begun. Thus, users 210 may have different side-conversations freely. However, after the users 210 sit down, the processor 102 may determine that the meeting has begun and begin filtering noise from side-conversations to allow the audio signal generated for a speaker to be as clear as possible.

After the processor 102 determines that the users 210 are sitting down and the meeting begins, the radar 108 may collect position data for each of the users $210_1$-$210_n$. The position data of each user $210_1$-$210_n$ may be compared to the predefined positions in the known body positions 106. At a later time, the processor 102 may determine that the position data of the users $210_2$ and $210_3$ indicate that they are having a side-conversation while the user $210_1$ is speaking.

The processor 102 may identify a microphone 402 that covers audio signals coming from a direction associated with the users $210_2$ and $210_3$. In some examples, the users $210_2$ and $210_3$ may be within a range associated with multiple microphones 402 (e.g. the microphone $402_3$ may cover the direction associated with the user $210_2$ and the microphone $402_4$ may cover the direction associated with the user $210_3$). The processor 102 may then mute the identified microphones 402 or may digitally remove audio signals received by the identified microphones 402 from the audio signals generated by the processor 102.

The arrangement 204 illustrates the apparatus 100 placed on a table 208 in the room. The users 212 may sit around the apparatus 100. The apparatus 100 may include two radars $108_1$ and $108_2$ arranged back-to-back to provide position data of users 212 360 degrees around the apparatus 100. For example, each radar $108_1$ and $108_2$ may provide 180 degree coverage of position data of users around the apparatus 100.

The apparatus 100 may operate in the arrangement 204 similar to how the apparatus 100 was described to operate in the arrangement 202. Thus, the apparatus 100 may filter noise associated with side-conversations from users 212 sitting around the apparatus or from users 210 sitting in front of the apparatus 100.

Figure 5:
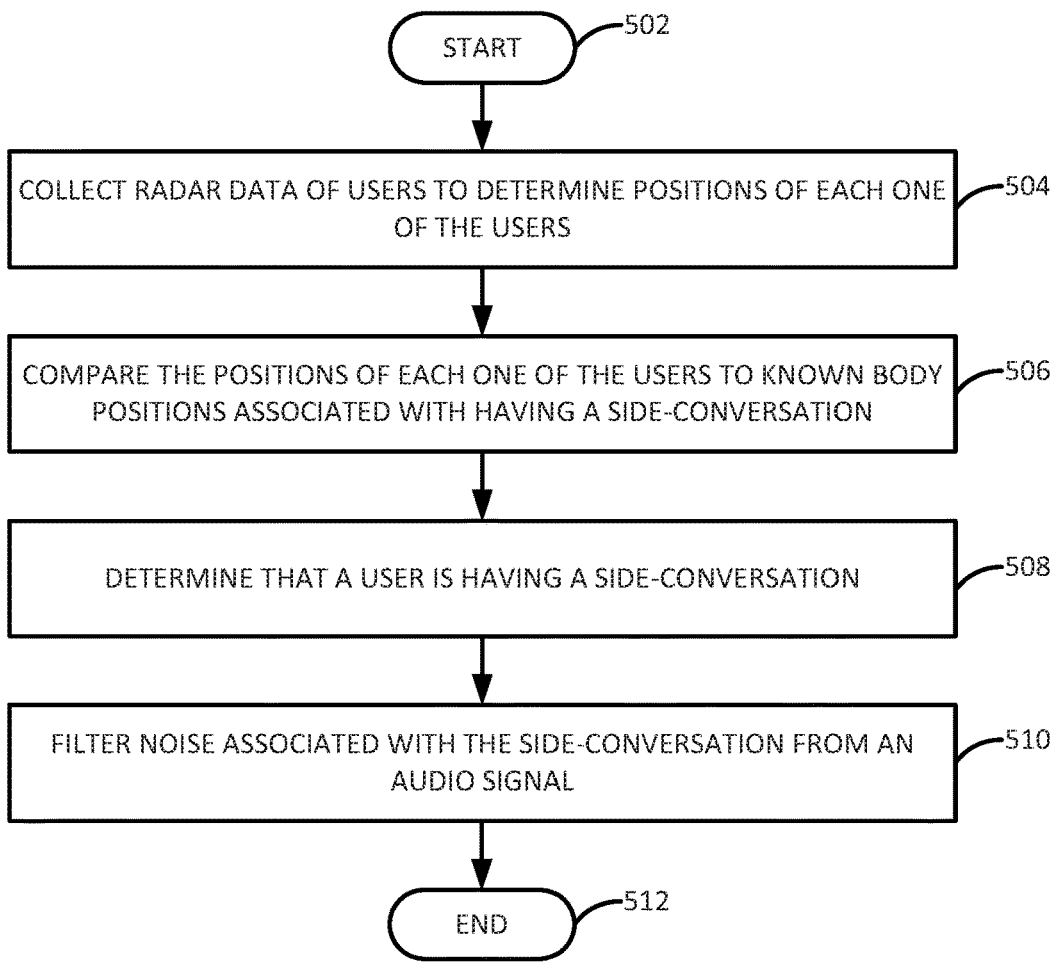
FIG. 5 is a flow chart of an example method for generating an audio signal with noise filtration based on data collected from a radar of the present disclosure.

FIG. 5 illustrates a flow diagram of an example method 500 for generating an audio signal with noise filtration based on data collected from a radar of the present disclosure. In an example, the method 500 may be performed by the apparatus 100 or the apparatus 600 illustrated in FIG. 6, and discussed below.

At block 502, the method 500 begins. At block 504, the method 500 collects radar data of users to determine positions of each one of the users. For example, radar data may be collected by a radar coupled to an apparatus or computing device. The radar may be a millimeter wave detection device that emits RF signals towards an object and collects position data based on the return RF signal. The position data may include an angle at which a user is sitting relative to the device, a distance from the device, a motion vector of the user, a direction of the user relative to the device, and the like.

In one example, the radar data may include a plurality of position data points for each user. Some of the position data may be an average value of the position data points. For example, the distance of the user may be based on an average distance of each position data point of a user. Some of the position data may be obtained based on an arrangement of the position data points. For example, a width of the position data points may be correlated to an angle relative to the apparatus or a shape of the position data points may indicate a posture, how a user is leaning, and the like.

At block 506, the method 500 compares positions of each one of the users to known body positions associated with having a side-conversation. For example, a memory may store body positions that are known to be positions associated with users having a side-conversation. The body positions may be pre-defined arrangements of the position data points. The body positions may be for multiple users. For example, body positions of two users leaning towards one another, body positions of two users who are within a predefined distance from one another, and the like.

In an example, the comparing may begin when a delta of the radar data is below a threshold. For example, the delta of certain radar data may be tracked to determine when the comparing block 506 should begin. In an example, the radar data may be a motion vector of the users. For example, when the delta of the motion vector of the users at two different points in time is below a threshold, it may be assumed that the users are sitting down and the meeting has begun. However, if the delta of the motion vector is above the threshold, it may be assumed that users are still walking into the room and the meeting has not yet begun.

At block 508, the method 500 determines that a user is having a side-conversation. For example, a user may be having a side-conversation when the arrangement of position data points of the user or of multiple users matches the predefined arrangement of position data points that is known to be associated with a side-conversation. In response, a microphone or multiple adjacent microphones that cover a direction associated with the user having the side-conversation may be identified.

At block 510, the method 500 filters noise associated with the side-conversation from an audio signal. In an example, the noise may be filtered by muting a microphone or microphones that are identified to cover a direction associated with the user having the side-conversation. In an example, the noise may be filtered digitally by removing the audio signals received by the identified microphone from the audio signal generated by a processor for transmission (e.g., the audio signal of a speaker in the room). The modified audio signal with the noise from the side-conversation removed may then be transmitted as part of a conference call.

In an example, the blocks 504-510 may be continuously repeated. As a result, the identified microphones may be turned back on or the audio signals received by the identified microphones may be added back into the audio signal that is generated when side-conversation ends. For example, the radar data may no longer indicate that the user is having a side-conversation. In other words, the arrangement of the position data points may no longer match a pre-defined arrangement of position data points associated with a body position indicating a side-conversation is occurring. At block 512, the method 500 ends.

Figure 6:
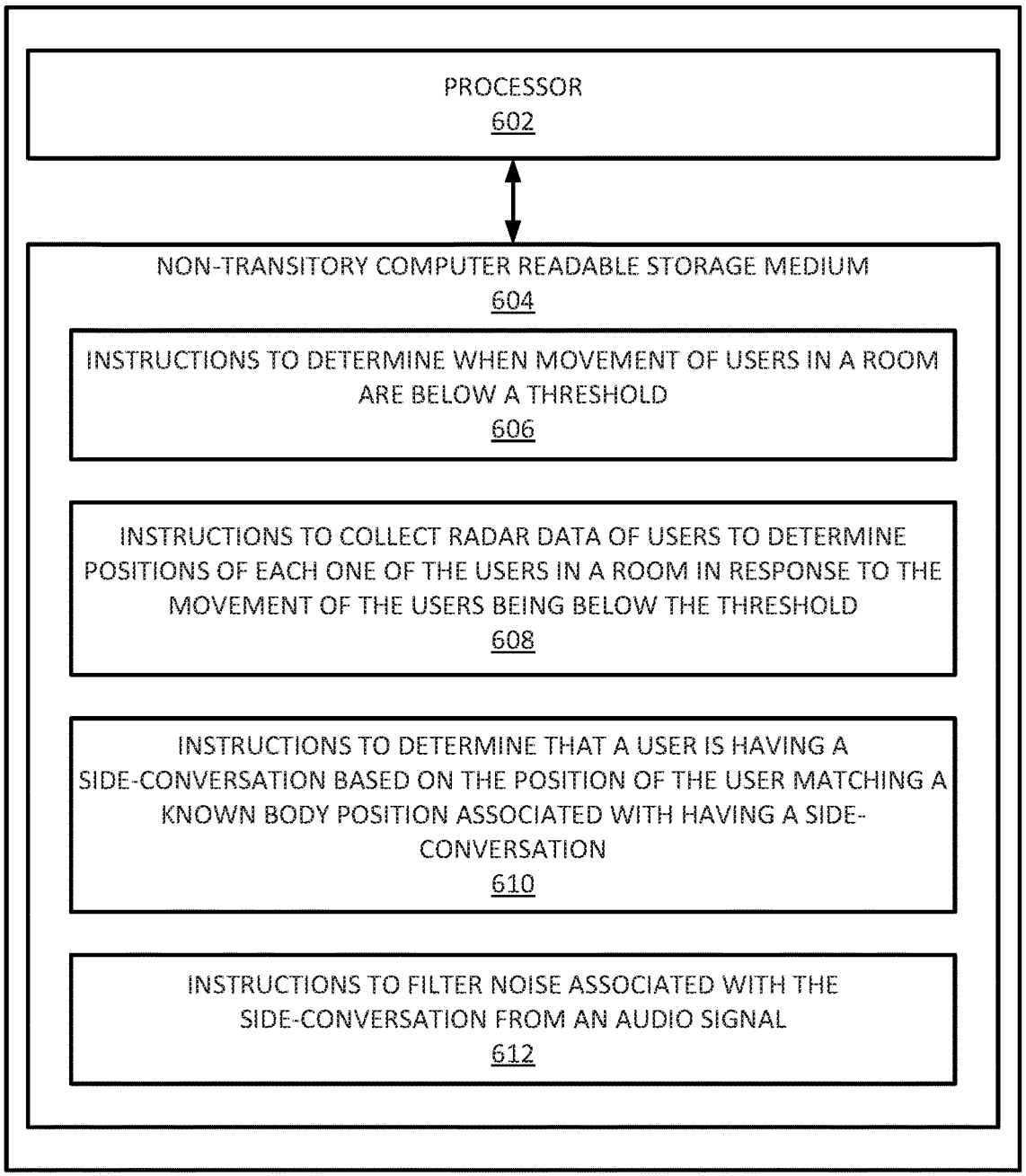
FIG. 6 is a block diagram of an example non-transitory computer readable storage medium storing instructions executed by a processor to generate an audio signal with noise filtration based on data collected from a radar.

FIG. 6 illustrates an example of an apparatus 600. In an example, the apparatus 600 may be the apparatus 100. In an example, the apparatus 600 may include a processor 602 and a non-transitory computer-readable storage medium 604. The non-transitory computer-readable storage medium 604 may include instructions 606, 608, 610, and 612 that, when executed by the processor 602, cause the processor 602 to perform various functions.

In an example, the instructions 606 may include instructions to determine when movement of users in a room are below a threshold. The instructions 608 may include instructions to collect radar data of users to determine positions of each one of the users in a room in response to the movement of the users being below the threshold. The instructions 610 may include instructions to determine that a user is having a side-conversation based on the position of the user matching a known body position associated with having a side-conversation. The instructions 612 may include instructions to filter noise associated with the side-conversation from an audio signal.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

The invention claimed is:

1. An apparatus, comprising:
a microphone to receive audio signals;
a radar to collect data on users in a location;
a memory to store known body positions associated with having a side-conversation; and
a processor in communication with the microphone, the radar, and the memory, wherein the processor is to:
determine that a user is having a side-conversation based on the data collected by the radar compared to the known body positions associated with having a side-conversation; and
filter noise associated with the side-conversation received by the microphone from a direction associated with the user.

2. The apparatus of claim 1, wherein the radar comprises a millimeter wave detection device that collect the data on the users in a 180 degree span.

3. The apparatus of claim 2, wherein the radar comprises two millimeter wave detection devices arranged back-to-back to collect the data on the users in a 360 degree span.

4. The apparatus of claim 1, wherein the data comprises an angle at which a user is sitting relative to the apparatus, a distance from the device, and a motion vector of the user.

5. The apparatus of claim 1, wherein the microphone comprises a plurality of microphones, wherein each one of the plurality of microphones is associated with an angular range.

6. The apparatus of claim 1, wherein the processor is to filter out the noise by muting one of the plurality of microphones associated with the angular range that includes the direction associated with the user.

7. A method, comprising:
   collecting radar data of users to determine positions of each one of the users;
   comparing the positions of each one of the users to known body positions associated with having a side-conversation;
   determining that a user is having a side-conversation; and
   filtering noise associated with the side-conversation from an audio signal.

8. The method of claim 7, wherein the filtering further comprises:
   determining a direction of the user from the radar data; and
   determining a microphone that is to receive audio signals in the direction of the user.

9. The method of claim 8, wherein the filtering comprises removing the noise from the audio signal.

10. The method of claim 8, wherein the filtering comprises muting the microphone.

11. The method of claim 7, wherein the radar data comprises a plurality of signals associated with the user, wherein the plurality of signals provides an image of an approximate body position of the user.

12. The method of claim 7, wherein the collecting comprises:
   tracking a delta of the radar data of the users periodically; and
   determining that the delta of the radar data for the user is below a threshold to begin the comparing.

13. A non-transitory computer-readable storage medium encoded with instructions executable by a processor, the non-transitory computer-readable storage medium comprising:
   instructions to determine when movement of users in a room are below a threshold;
   instructions to collect radar data of users to determine positions of each one of the users in a room in response to the movement of the users being below the threshold;
   instructions to determine that a user is having a side-conversation based on the position of the user matching a known body position associated with having a side-conversation; and
   instructions to filter noise associated with the side-conversation from an audio signal.

14. The non-transitory computer readable storage medium of claim 13, further comprising:
   instructions to update the known body position associated with having a side-conversation over time from the radar data that is collected.

15. The non-transitory computer readable storage medium of claim 14, wherein the known body position associated with having a side-conversation is stored in a remotely located server.

* * * * *